United States Patent [19]

Vernon

[11] Patent Number: 4,695,823
[45] Date of Patent: Sep. 22, 1987

[54] VEHICLE TIRE MONITORING APPARATUS

[76] Inventor: Roger W. Vernon, Box 608, Georgetown, Colo. 80444

[21] Appl. No.: 604,934

[22] Filed: Apr. 27, 1984

[51] Int. Cl.[4] .................. B60C 23/00; B60C 23/02
[52] U.S. Cl. ..................................... 340/58; 73/146.8
[58] Field of Search ............ 340/58; 200/61.25, 61.22; 73/146.5, 146.8; 137/226, 227; 99/330

[56] References Cited

U.S. PATENT DOCUMENTS

| 3,786,413 | 1/1974 | Ross et al. | 340/58 |
|---|---|---|---|
| 4,048,614 | 9/1977 | Shumway | 340/58 |
| 4,072,927 | 2/1978 | O'Neil | 340/58 |
| 4,137,520 | 1/1979 | Deveau | 340/58 |
| 4,160,234 | 7/1979 | Karbo et al. | 340/58 |
| 4,237,728 | 12/1980 | Betts et al. | 340/58 |
| 4,263,579 | 4/1981 | Corgan et al. | 340/58 |
| 4,300,119 | 11/1981 | Wiernicki | 340/58 |
| 4,300,120 | 11/1981 | Surman | 340/58 |
| 4,311,984 | 1/1982 | Rigazio et al. | 340/58 |
| 4,543,457 | 9/1985 | Petersen et al. | 200/61.25 X |

FOREIGN PATENT DOCUMENTS

| 2642172 | 3/1978 | Fed. Rep. of Germany | 340/58 |
|---|---|---|---|
| 2915272 | 10/1980 | Fed. Rep. of Germany | 340/58 |

OTHER PUBLICATIONS

Electronics, Aug. 11, 1983 "Chip Senses Heat, Pressure".

Primary Examiner—Glen R. Swann, III
Assistant Examiner—Thomas J. Mullen, Jr.
Attorney, Agent, or Firm—Gerald J. Ferguson, Jr.; Michael P. Hoffman; Ronni S. Malamud

[57] ABSTRACT

A monitor for telemetering data such as temperature or pressure from a vehicle tire or the like including a transducer responsive to the data; a processor responsive to the transducer; and a transmitter responsive to the processor for transmitting the processed electrical signal to a remote location where the transducer, processor and transmitter are disposed on a single integrated circuit. Various techniques for mounting the transducer and for encoding the telemetered signal are also disclosed.

6 Claims, 4 Drawing Figures

VEHICLE TIRE MONITORING APPARATUS

BACKGROUND OF THE INVENTION

This invention relates to tire monitoring apparatus and the like.

A tire pressure monitoring device is disclosed in U.S. Pat. No. 4,137,520. The device comprises a wire strain gauge employed as a pressure transducer which is connected to a telemetering circuit disposed on an integrated circuit chip. Also disclosed is circuitry for encoding the telemetering signals to discriminate one tire from another.

U.S. Pat. No. 4,237,728 discloses a tire pressure transducer/telemetering system where the transducer is mechanically activated and may include a piezoelectric crystal or the like to detect either under or over inflated tire conditions. Each time an abnormal condition is sensed, a pulse is generated. After a predetermined number has been sensed in a given period of time, an alarm signal is sent.

U.S. Pat. No. 4,160,234 discloses a tire pressure monitoring apparatus including a charge storage release circuit which produces a pulsed abnormal condition signal. The charge portion of the circuit stores the transducer signal until a predetermined signal level is reached, at which time it is transmitted.

An article in "Electronics" magazine, Aug. 11, 1983, entitled "Chip Senses Heat, Pressure" describes a pressure-temperature transducer with associated signal processing circuitry disposed on an integrated circuit chip.

Other patents of interest are U.S. Pat. Nos. 4,048,614; 4,072,927; 4,263,579; 4,300,119; 4,300,120 and 4,311,984.

All of the above prior art references are submitted herewith and it is requested they be made of record.

SUMMARY OF THE INVENTION

A primary object of the present invention is to provide an improved tire monitoring apparatus.

A further object of the invention is to provide apparatus of the above type where pressure and/or temperature transducing circuitry together with telemetering circuitry is incorporated on the same integrated circuit chip.

A further object of the present invention is to provide an apparatus of the above type which may be connected to or be made part of a tire stem without consideration of tire balance due to its small size.

A further object of the present invention is to provide apparatus of the above type for monitoring the pressure of tires in automobiles, trucks, trailers, airplanes and other vehicles supported and running on pneumatic tires, and to give warning and to indicate a variation and lessening of a tire's pressure. The apparatus is particularly applicable to trucks and trailers having a multiplicity of running wheels supported by pneumatic tires.

Other objects and advantages of this invention will be apparent from a reading of the following specification and claims taken with the drawing.

DETAILED DESCRIPTION OF THE PREFERRED EMBODIMENT

Figure 1:
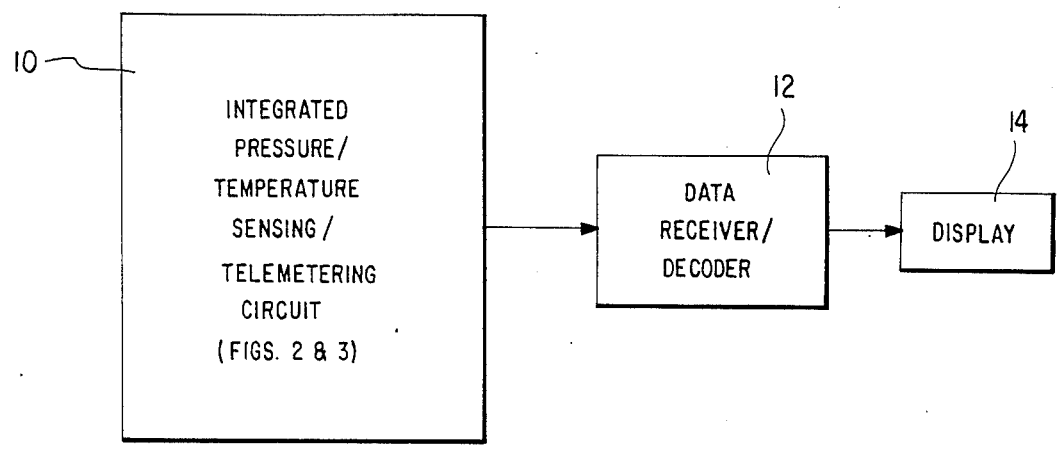
FIG. 1 is a block diagram of an illustrative overall system in accordance with the invention.

Reference should be made to the drawing where the like reference numerals refer to like parts.

Figure 2:
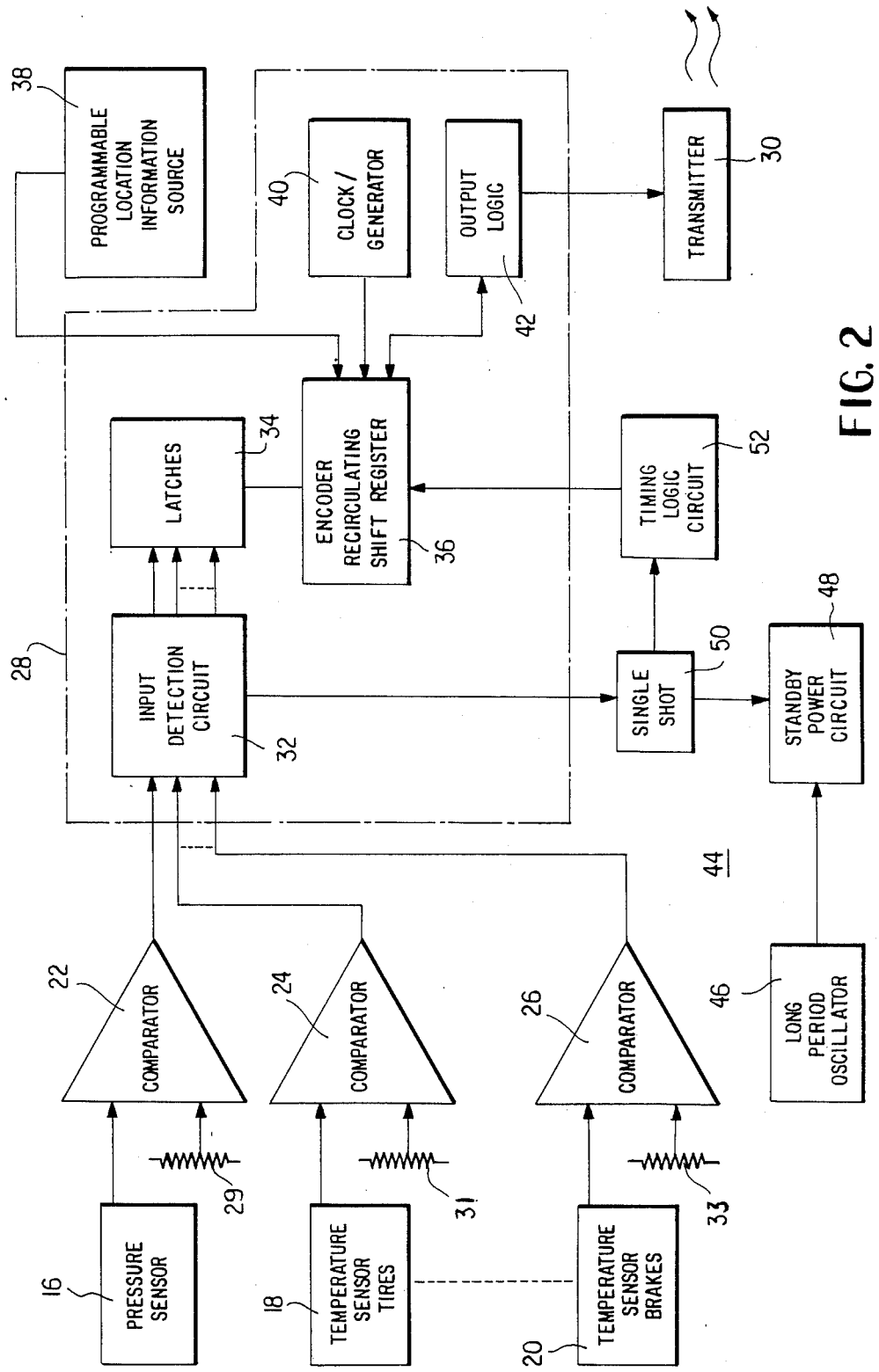
FIG. 2 is a block diagram of an illustrative integrated pressure/temperature sensing/telemetering circuit as used in FIG. 1.
Figure 3:
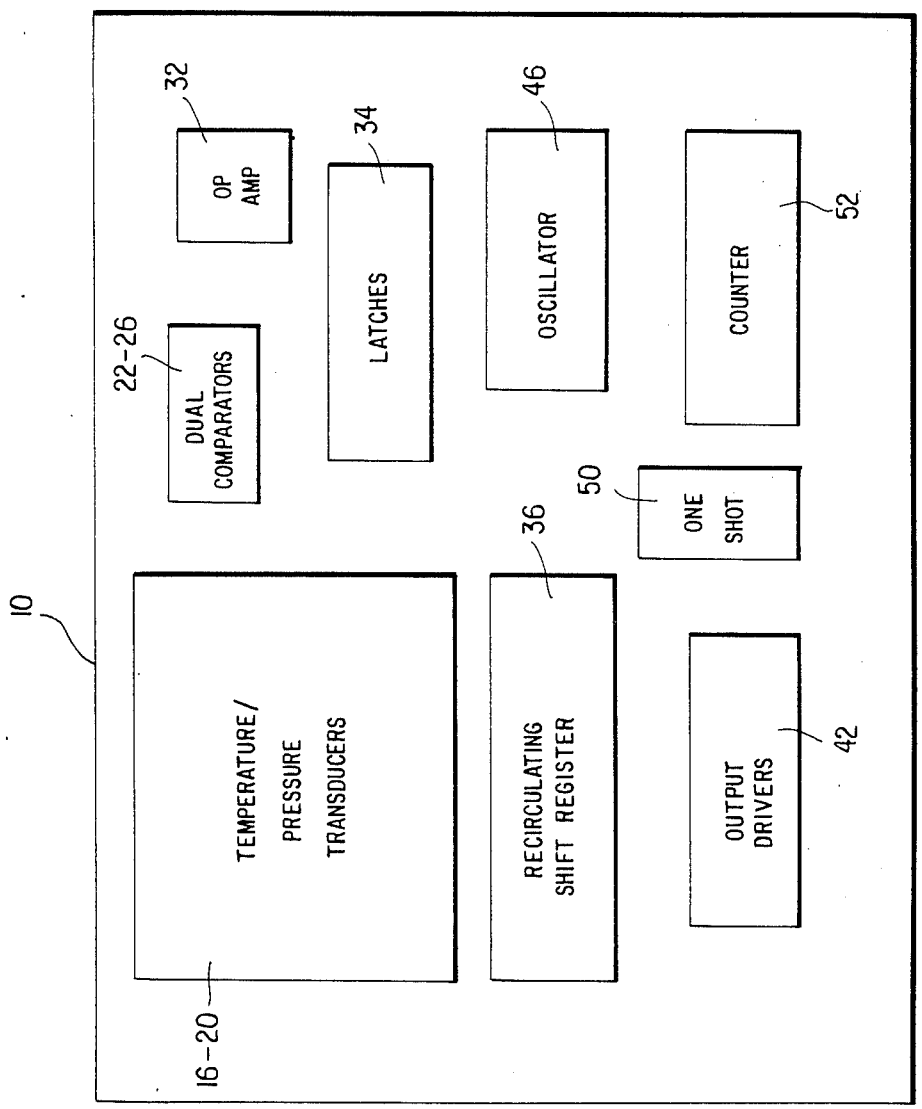
FIG. 3 is an illustrative integrated circuit chip showing the location of various elements of the circuit of FIG. 2 on the chip.

Referring to FIG. 1, there is shown an illustrative block diagram of an overall system in accordance with the invention, which includes an integrated pressure/temperature sensing/telemetering circuit 10, which is shown in greater detail in FIGS. 2 and 3 and which, in general, senses a pressure and/or temperature to be measured and transmits an encoded signal. The transmitted signal is encoded with the measured temperature and/or pressure data together with a location code which indicates the location of circuit 10 on a vehicle or the like.

The encoded signal is transmitted to a data receiver/decoder 12, which may be, for example, a Linear Model D-8C digital receiver, where the encoded data is extracted from the transmitted signal. The encoded data is employed to activate a display 14, which may be light emitting diodes, located, for example, at the instrumental panel of the vehicle where the displayed data may include an indication of an underinflated condition of a particular tire.

Referring now to FIG. 2 an illustrative block diagram of the integrated pressure/temperature sensing/telemetering circuit 10 of FIG. 1, there are shown pressure and temperature sensors 16 and 18 (usually located in or on a tire or the like) and a temperature sensor 20 located at the brakes, for example. As indicated in FIG. 2, other sensors may also be employed. All of the sensors included on the chip may correspond to the type manufactured by Transensory Devices, Inc., their integrated circuit pressure/temperature sensor being discussed hereinbefore with respect to the article occurring in the Aug. 11, 1983 issue of "Electronics" magazine. It should be understood that although sensors 16–20 have been shown associated with one another in the same circuit, for ease of illustration, sensors 16 and 18 are actually at one location (a tire) while sensor 20 is at another (a brake). Hence, sensors 16 and 18 are, in fact, located at one integrated circuit 10 while sensor 20 is located at another circuit 10. In general, a circuit 10 will be disposed at each location where a parameter such as temperature or pressure is to be measured. Of course, at a given location a number of different parameters can be sensed.

The outputs of sensors 16–20 are applied to comparators 22–26, respectively. Also applied to the comparators in a known manner are reference, threshold voltages from variable resistors 29–33. The outputs of the comparators are applied to an encoder/output module 28 indicated by the phantom line. Encoder/output module 28 is well known and may correspond to the National Semiconductor LM 1871, General Instrument AY-3-8470 or other devices used for remote transmission purposes. The encoder/output module 28, in general, encodes the sensed data into a multibit word and outputs the word to a transmitter 30 with the correct format and timing. The module 28 includes an input detection circuit 32 responsive to the outputs of comparators 22–26. These outputs are applied to and held by latches 34 for application to encoder 26, which may be of the recirculating shift register type. Also applied to encoder 36 is the location of integrated circuit 10 from a programmable location information source 38. A clock/generator 40 is also applied to the encoder. As stated above, the encoded signal is a multibit word which is applied to output logic 42 and then transmitter 30 for transmission to data receiver/decoder 12.

Standby power circuitry generally indicated at 44 is also employed, its purpose being to remove power from most of the circuitry for predetermined periods of time to reduce power consumption. This circuitry includes a long period oscillator 46, which may be of a type corresponding to National Semiconductor LM3909, and which times the power on cycle, its output being applied to a standby power circuit 48. Also applied to circuit 48 is the output of a single shot 50, the single shot being actuated by an output from input detection circuit 32. The output of the single shot is also applied to a timing logic circuit 52, the output of which is, in turn, applied to encoder 36.

In operation, during the power on cycle, as determined by oscillator 46, the sensors 16–20 receive power from circuit 48 for a short time. The sensed signals are applied to the comparators where out-of-range signals are tested for in accordance with the thresholds set at variable resistors 29–33. If an out-of-range condition exists, the multibit word generated by encoder 36 would include a code for that particular condition. Moreover, it would include a code, as determined by source 38, identifying the location of the sensor in the vehicle. The remaining circuitry insures the word transmitted by transmitter 30 has the correct format and timing.

Reference should now be made to FIG. 3 which illustrates how certain ones of the elements of FIG. 2 may be physically located on an integrated circuit chip. The other elements may also be incorporated in a known manner.

Figure 4:
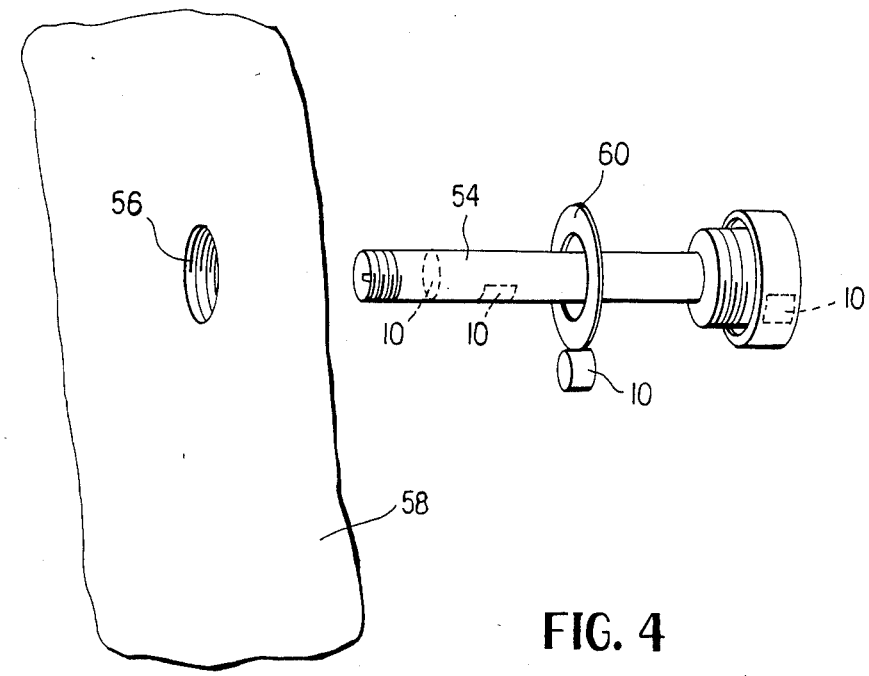
FIG. 4 is a modified perspective drawing showing the location of the integrated circuit of FIG. 2 in or on a tire valve stem.

Referring to FIG. 4, there are illustrated various methods of mounting integrated circuit 10 with respect to a tire stem 54, which may be an already existing stem or a specially constructed stem. In one arrangement, an existing stem may be employed, which stem normally extends through a valve stem mounting hole 56 disposed in a partially illustrated wheel 58. Prior to insertion of the stem through mounting hole 56, integrated circuit 10 may be mounted on the stem via a ring 60, the circuit being attached to the ring where the ring and/or stem may serve as an antenna. Once the stem is secured in place through hole 56, the integrated circuit will be securely mounted with respect to the stem to monitor tire temperature and/or pressure. Other possible locations of circuit 10 within stem 54, particularly where the stem is specially constructed to incorporate the circuit are indicated by dotted lines within the stem in FIG. 4.

In one preferred version of the device there is a fail-safe light, in addition to the numbered tire pressure fault indicating lights, which remains illuminated only while the system is fully operational.

It is to be understood that the above detailed description of the various embodiments of the invention is provided by way of example only. Various details of design and construction may be modified without departing from the true spirit and scope of the invention as set forth in the appended claims.

I claim:

1. An integrated circuit monitor for telemetering data such as temperature or pressure from a vehicle tire comprising
    sensing means constituting an integral part of an integrated circuit for transducing a sensed parameter to an electrical signal;
    means constituting a further integral part of said integrated circuit for processing said electrical signal;
    transmitting means constituting yet a further integral part of said integrated circuit for transmitting the processed, electrical signal to a remote location;
    means for mounting said integrated circuit with respect to said tire; and
    whereby said integrated circuit includes as integrated circuit elements thereof at least said sensing means, processing means and transmitting means.

2. A monitor as in claim 1 where said integrated circuit is mounted with respect to a valve stem for said tire.

3. A monitor as in claim 2 where said integrated circuit is mounted on a ring disposed about the valve stem.

4. A monitor as in claim 2 where said integrated circuit is mounted within the valve stem.

5. A monitor as in claim 1 where the monitor is located on a vehicle and where said processing means includes (a) means for generating an out-of-range signal whenever the electrical signal is outside a predetermined range of values, and (b) means for generating said processed signal encoded with an out-of-range condition in response to the out-of-range signal being generated.

6. A monitor as in claim 5 where said processing means includes (a) means for generating a signal indicative of the location of the integrated circuit on the vehicle and (b) means for encoding said processed signal with said latter signal.

* * * * *